Sept. 24, 1963    F. N. BRETTHAUER    3,104,688
BAND SAW GUARD

Filed July 8, 1960    2 Sheets-Sheet 1

INVENTOR
FRANK N. BRETTHAUER
BY
ATTORNEY

Sept. 24, 1963    F. N. BRETTHAUER    3,104,688
BAND SAW GUARD
Filed July 8, 1960    2 Sheets-Sheet 2
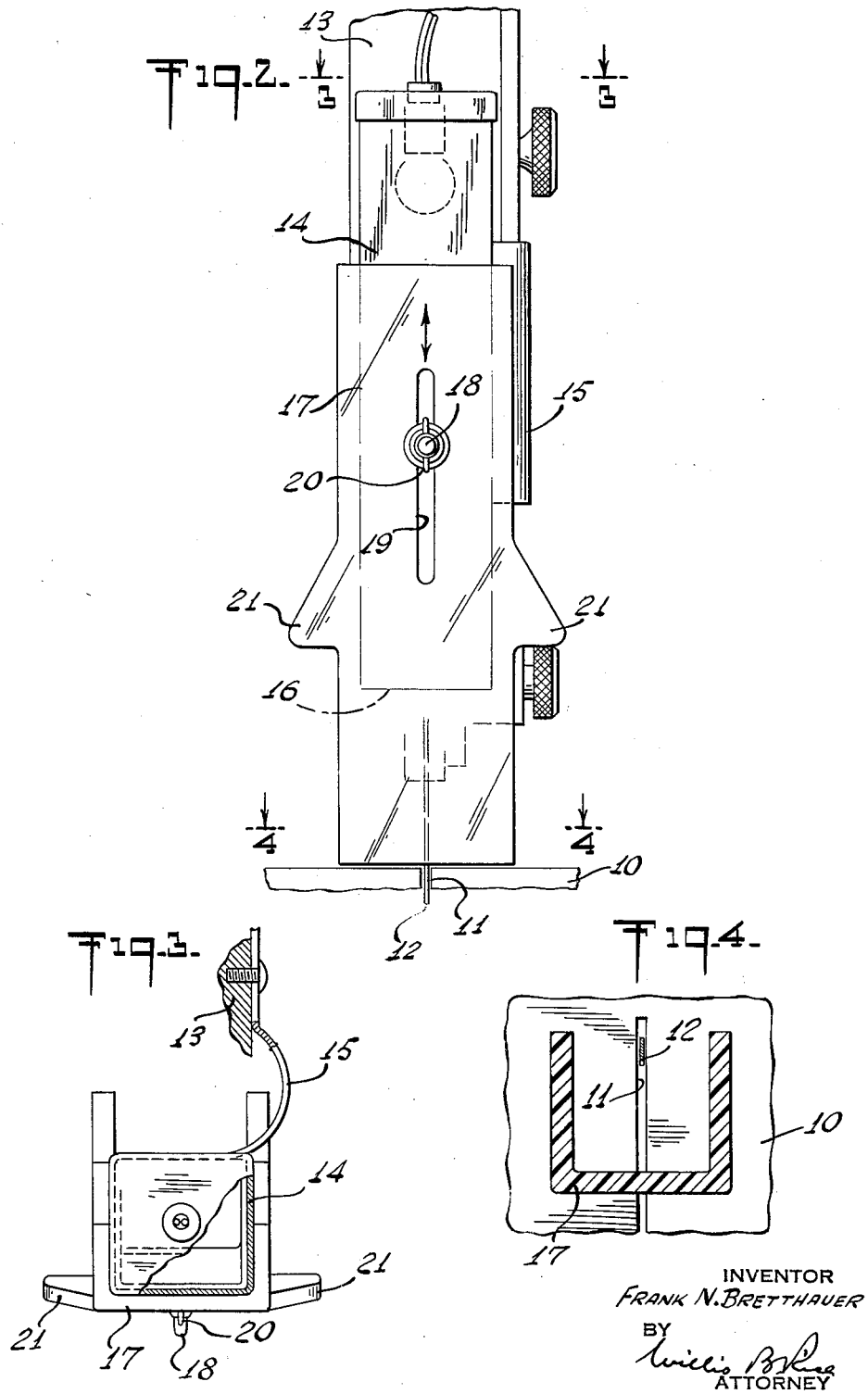
INVENTOR
FRANK N. BRETTHAUER
BY
ATTORNEY United States Patent Office 3,104,688
Patented Sept. 24, 1963

3,104,688
BAND SAW GUARD
Frank N. Bretthauer, R.F.D. 1, Putnam Valley, N.Y.
Filed July 8, 1960, Ser. No. 41,694
1 Claim. (Cl. 143—159)

This invention relates to a guard mechanism for use with power saws. It is an object of this invention to provide a guard which when installed upon the machine will give perfect protection from the saw in all normal usage of the latter, and yet which permits substantially the same freedom of access to, and use of the saw as if the guard were not present.

It is a further object to provide a guard of the character described which during the operation of the saw permits the work at the point where the saw is acting upon it to be visible to the operator.

It is a further object to provide a guard which may be easily lifted to afford access to the work, but which will automatically fall into fully protecting position as soon as it is released.

It is a further object to provide a saw guard which is easy to install and effective in operation.

The device is shown in a preferred embodiment in the accompanying drawings, in which FIG. 1 is a perspective view of the saw table with the guard attached showing the upper portions of the band saw;

FIG. 2 is a front elevation viewed from the cutting plane;

FIG. 3 is a top plane view on the line 3—3 of FIG. 2; and

FIG. 4 is a section on the line 4—4 of FIG. 2.

Figure 1:
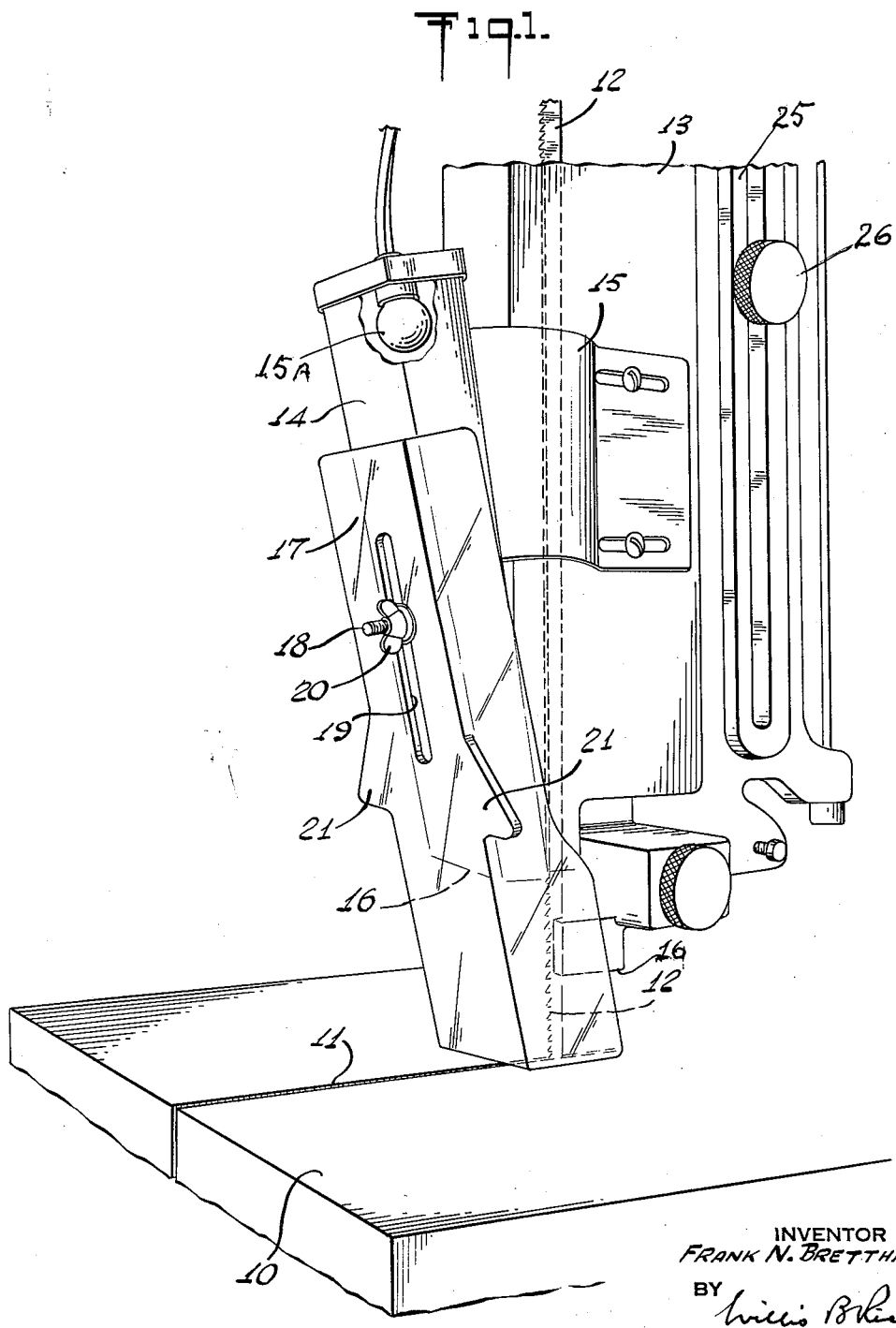

In the figures only the table and relevant parts of the saw are shown since these are the only parts concerned with this invention.

The saw itself comprises a table 10 having a slot 11 for the saw blade 12 and an upright casing 13 through which the saw blade 12 passes. Only a fragment of the saw blade is shown at 12, it being understood that this is a portion of a continuous blade that is carried around over suitable pulleys at top and bottom in the usual manner with the usual drive and control, and here as is usually the case, the saw moves downwardly through the casing 13 urging the work against the table as it is being sawed.

As here shown the guard of this invention is itself carried by a rectangular metal tube 14 mounted upon the casing 13, and held in place upon the casing by brackets 15. This tube preferably carries an electric light 15a. As will be seen from the drawings the tube 14 is inclined downwardly and inwardly toward the blade 12 at the bottom. The tube 14 terminates in a plane 16 substantially above the top of the table.

The guard itself comprises a channel shaped guard 17 composed of a transparent plastic which extends over and is slidable vertically upon the tube 14, and is held in any adjusted position by means of a screw 18 which is attached to the tube 14 and passes through a slot 19 in the plastic shield and carries a nut 20. The guard 17 is provided with finger grips 21, so that it can be raised off the work by a finger.

The slot 19 is of such length that when the thumb nut is loosened, the plastic shield may be raised high above the table 10 of the machine and during operation, it may be held just above or may be allowed to rest upon the top of whatever work piece is being cut by the machine, so as to prevent any access of the fingers to the saw blade.

The guard will normally fall upon and rest upon the top of the work piece as the piece is passed through the saw, but it is readily raised by means of the finger grips, to permit a more intimate inspection.

If however the top surface of the work piece is not sufficiently smooth the guard may be fastened in a raised position by the nut 20.

The casing 13 has a slot 25 through which passes an adjusting screw 26 which screws into the frame of the saw so that the guard may be held at different heights upon the machine.

When it is desired to operate the machine with the guard attached, the frame 13 is mounted at a proper height to permit the work to pass freely below the casing. Then the guard is lifted and held in the upraised position by nut 20, until the work piece is in position.

Then the guard 17 is permitted to fall upon the upper face of the work and the sawing operation is begun.

At any time desired, the casing may be raised to permit more intimate inspection of the work, but ordinarily, because the casing is transparent, this will not be necessary.

What is claimed:

A shielding device for use with a band saw of a type having a horizontal work table having a slot therein, and a frame supporting a band saw moving vertically downwardly through said slot in position to engage a work piece pressed against the teeth of said saw on said table at a work point, said shielding device comprising a tubular member attached to said frame in front of said saw having a light in its upper end, said tubular member being inclined to cause said light to illumine said work point, and a channel shaped member comprising a transparent shield slidable on said tubular member from an upper position to expose the work piece in the vicinity of the work point to a lower position resting on the work piece, enclosing said work point against contact therewith.

References Cited in the file of this patent
UNITED STATES PATENTS

| | | |
|---|---|---|
| 1,054,288 | Fleming | Feb. 25, 1913 |
| 1,164,669 | Steinman | Dec. 21, 1915 |
| 1,369,824 | McDonnell | Mar. 1, 1921 |
| 2,506,610 | Mueller | May 9, 1950 |
| 2,714,904 | Bolton | Aug. 9, 1955 |

FOREIGN PATENTS

| | | |
|---|---|---|
| 599,718 | Great Britain | Mar. 18, 1948 |
| 720,558 | Great Britain | Dec. 22, 1954 |
| 982,693 | France | Jan. 31, 1951 |
| 1,041,826 | France | June 3, 1953 |
| 1,112,523 | France | Nov. 16, 1955 |